United States Patent
Breitling et al.

(10) Patent No.: US 12,197,722 B2
(45) Date of Patent: Jan. 14, 2025

(54) SYSTEMS AND METHODS FOR DETECTING HAND USAGE IN KEYBOARD INTERACTION

(71) Applicant: LEXISNEXIS RISK SOLUTIONS FL INC., Boca Raton, FL (US)

(72) Inventors: Julian Breitling, Ulm (DE); Philip Lindblad, Lidingö (SE); Per Burström, Luleå (SE)

(73) Assignee: LEXISNEXIS RISK SOLUTIONS FL INC., Boca Raton, FL (US)

( * ) Notice: Subject to any disclaimer, the term of this patent is extended or adjusted under 35 U.S.C. 154(b) by 0 days.

(21) Appl. No.: 18/473,393

(22) Filed: Sep. 25, 2023

(65) Prior Publication Data
US 2024/0256120 A1 Aug. 1, 2024

Related U.S. Application Data

(60) Provisional application No. 63/482,391, filed on Jan. 31, 2023.

(51) Int. Cl.
*G06F 3/04886* (2022.01)
*G06F 3/023* (2006.01)

(52) U.S. Cl.
CPC ........ *G06F 3/04886* (2013.01); *G06F 3/0233* (2013.01)

(58) Field of Classification Search
CPC ............................ G06F 3/04886; G06F 3/0233
See application file for complete search history.

(56) References Cited

U.S. PATENT DOCUMENTS

| | | | | |
|---|---|---|---|---|
| 10,248,311 B2 * | 4/2019 | Pingco | ................ | G06F 3/04883 |
| 10,860,209 B1 * | 12/2020 | Sethi | ..................... | G06F 3/0482 |
| 11,531,735 B1 * | 12/2022 | Patel | ..................... | G06F 21/316 |
| 11,734,754 B1 * | 8/2023 | Chavez | ................ | G06N 20/00 |
| | | | | 705/38 |
| 2010/0302000 A1 * | 12/2010 | Szymkowiak | ...... | C04B 41/4922 |
| | | | | 340/5.82 |
| 2015/0324563 A1 * | 11/2015 | Deutschmann | ....... | G06F 16/285 |
| | | | | 726/7 |
| 2017/0104875 A1 * | 4/2017 | Im | ..................... | H04M 3/42221 |
| 2019/0370493 A1 * | 12/2019 | Deutschmann | ..... | H04L 63/0861 |
| 2020/0273040 A1 * | 8/2020 | Novick | .............. | G06Q 20/4016 |

\* cited by examiner

*Primary Examiner* — Christopher E Leiby
(74) *Attorney, Agent, or Firm* — Troutman Pepper Hamilton Sanders LLP; James E. Schutz; Mark Lehi Jones

(57) ABSTRACT

Systems and methods are provided for detecting when a user uses one or both hands to interact with a device having a physical or virtual keyboard. In one implementation, one-handed typing is determined by analyzing intragroup and intergroup keyflight timing distributions between different groups of clustered keys, each cluster having distinctly different proximal properties. A statistical measure made between the intragroup and intergroup keyflight timing distributions may be performed to determine one-handed or two-handed typing input, which may be used to enhance a user experience by adapting a viewing or input element to an appropriate hand setting. In another implementation, the detection may be used as input to determine a likelihood of suspected coaching fraud for online banking applications. In yet another implementation, the detection of one-handed typing is used as an input to bot detection algorithms to reduce false positives from other modalities.

20 Claims, 11 Drawing Sheets

SYSTEMS AND METHODS FOR DETECTING HAND USAGE IN KEYBOARD INTERACTION

CROSS-REFERENCE TO RELATED APPLICATIONS

This application claims priority under 35 U.S.C. 119 to U.S. Provisional Patent Application No. 63/482,391 entitled "Systems and Methods for Detecting Hand Usage in Keyboard Interaction," filed 31 Jan. 2023, the contents of which are incorporated by reference in their entirety as if fully set forth herein.

FIELD OF THE DISCLOSED TECHNOLOGY

The disclosed technology relates to systems and methods for detecting the way a user interacts with a computing device having a keyboard. More specifically, the disclosed technology relates to a method for detecting when a user uses one hand or both hands to type on a keyboard.

BACKGROUND

State of the art behavioral biometrics processes utilize algorithms that can determine a likelihood that a user's behavior corresponds to a known trained behavioral profile (e.g., normal user behavior, fraudulent behavior, etc.). Behavioral algorithms take, as input, any data that can be extracted from the user interaction with an electronic device during a transaction, a session, a login etc. This data can include keystroke timings, mouse movements, touchscreen behavior, and/or other types of sensor data.

Current state of the art behavioral biometrics routines can utilize user navigation metrics to infer certain scenarios for which the user interacts with a device. For example, as discussed in U.S. Pat. No. 11,037,163, behavioral biometrics can determine a probability that a user is being "coached" during a session or transaction by analysis of various user device inputs and device interactions. Such routines may be used to mitigate transactions where an authorized user is being coached by a fraudster. These metrics can include dwell times within and between fields for data input in the fields, aspects of mouse movements, the number and type of corrections to mistyping being performed, etc.

Keyboard interaction is a common method for inputting data and navigating through electronic devices, such as computers, smartphones, and tablets. In some cases, users may input (e.g., type) responses or other information into their device using both hands, while in other cases they may only use one hand. The way a user types may have an impact on their typing speed, accuracy, and overall user experience.

Certain factors can impact the way a user types, including the size and layout of the keyboard, the proximity of the keys to each other, and the user's hand size and dexterity. In some cases, it may be desirable to detect when a user is typing with one hand versus both hands to better suit the user's needs and/or to utilize such detection for corroborating/enhancing behavioral biometrics, authentication, etc.

Existing technologies do not consider the style of typing to further optimize user experience on either web browser or mobile applications. There currently exists no way of determining an appropriate keyboard/input element layout and/or position based on how the user interacts with the device. There is a need for determining whether a user is typing with one or two hands on their device.

BRIEF SUMMARY

The disclosed technology includes systems and methods for detecting hand usage in keyboard interaction by analyzing keyflight statistics between different keys and/or groups of keys that have different proximal properties.

In accordance with certain exemplary implementations of the disclosed technology, a method is provided for detecting one-handed or two-handed typing on a device. The method includes dividing a key layout of a keyboard into two or more clusters of keys, each cluster defining a centroid based on coordinates of the keys of a corresponding cluster, receiving intragroup keyflight timing distributions corresponding to key presses within clusters of the two or more clusters, receiving intergroup keyflight timing distributions corresponding to key presses between clusters of the two or more clusters, determining, based on the intragroup keyflight timing distributions and the intergroup keyflight timing distributions that the key presses correspond to one-handed typing input responsive to determining that one or more statistical measure of the intergroup keyflight timing distributions is greater than corresponding statistical measures of the intragroup keyflight timing distributions. In certain implementations, the method can include adapting an input element key layout based on the determining.

In accordance with certain exemplary implementations of the disclosed technology, a system is provided for detecting one-handed or two-handed typing on a device. The system comprises a keyboard, a processor, and memory in communication with the processor, and storing instructions that, when executed by the processor, cause the processor to divide a key layout of the keyboard into two or more clusters of keys, each cluster defining a centroid based on coordinates of the keys of a corresponding cluster, receive intragroup keyflight timing distributions corresponding to key presses within clusters of the two or more clusters, receive intergroup keyflight timing distributions corresponding to key presses between clusters of the two or more clusters, determine, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions. In certain implementations, the system may adapt an input element key layout based on determined one-handed or two-handed typing.

In accordance with certain exemplary implementations of the disclosed technology, a non-transitory computer-readable storage medium is provided for storing instructions that are configured to cause one or more processors to perform a method of dividing a key layout of a keyboard into two or more clusters of keys, each cluster defining a centroid based on physical coordinates of the keys of a corresponding cluster, receiving intragroup keyflight timing distributions corresponding to key presses within clusters of the two or more clusters, receiving intergroup keyflight timing distributions corresponding to key presses between clusters of the two or more clusters, determining, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions, and adapting an input element key layout based on the determining.

Certain implementations of the disclosed technology can further include determining, based on the intragroup keyflight timing distributions and the intergroup keyflight timing distributions that the key presses correspond to two-handed typing input responsive to determining that one or more statistical measure of the intergroup keyflight timing distributions is less than corresponding statistical measures of the intragroup keyflight timing distributions.

Certain exemplary implementations of the disclosed technology may be used to determine how a user holds a device and/or if the user is typing using one or two hands. Such determination can be used to provide further input into a behavioral biometrics routine and/or to automatically revise a virtual keyboard layout for enhancing human interface ergonomics.

DETAILED DESCRIPTION

The systems and methods disclosed herein can enable the detection of one-handed or two-handed typing (i.e., input entry via a keyboard) based on how a user interacts with a device having a physical or virtual keyboard. In accordance with certain exemplary implementations of the disclosed technology, one-handed vs. two-handed typing can be determined by analyzing intragroup and intergroup keyflight timing distributions between different groups of clustered keys, each cluster having distinctly different proximal properties.

A "keypress" as defined herein is the amount of time a key (virtual or physical) is being pressed or held down during input. A "keyflight" is defined herein as the time between actuating different keys of a pair of keys. In certain implementations, a statistical measure of the intragroup and intergroup keyflight and/or keypress timing distributions may be performed to determine one-handed or two-handed input by the user.

In certain implementations where a virtual keyboard is utilized, the detection of one-handed vs. two-handed typing may be used to enhance a user experience, for example, by automatically adapting/reconfiguring one or more input elements/keys to a different layout that is appropriate or most ergonomically comfortable or efficient for the hand(s) doing the data entry. A virtual keyboard, as discussed herein, may be utilized for user input on certain mobile devices having touchscreens with software-based user interfaces that can be displayed, reconfigured, adapted, etc.

In certain implementations, the detection of one-handed vs. two-handed typing may be used for certain behavioral biometric algorithms, for example, to determine a likelihood of suspected coaching and/or as input to bot detection algorithms to reduce false positives from other modalities. Such uses may employ physical keyboards or virtual keyboards. Additional details regarding the detection of one-handed vs. two-handed data entry will be further discussed below with reference to the figures.

Figure 1A:
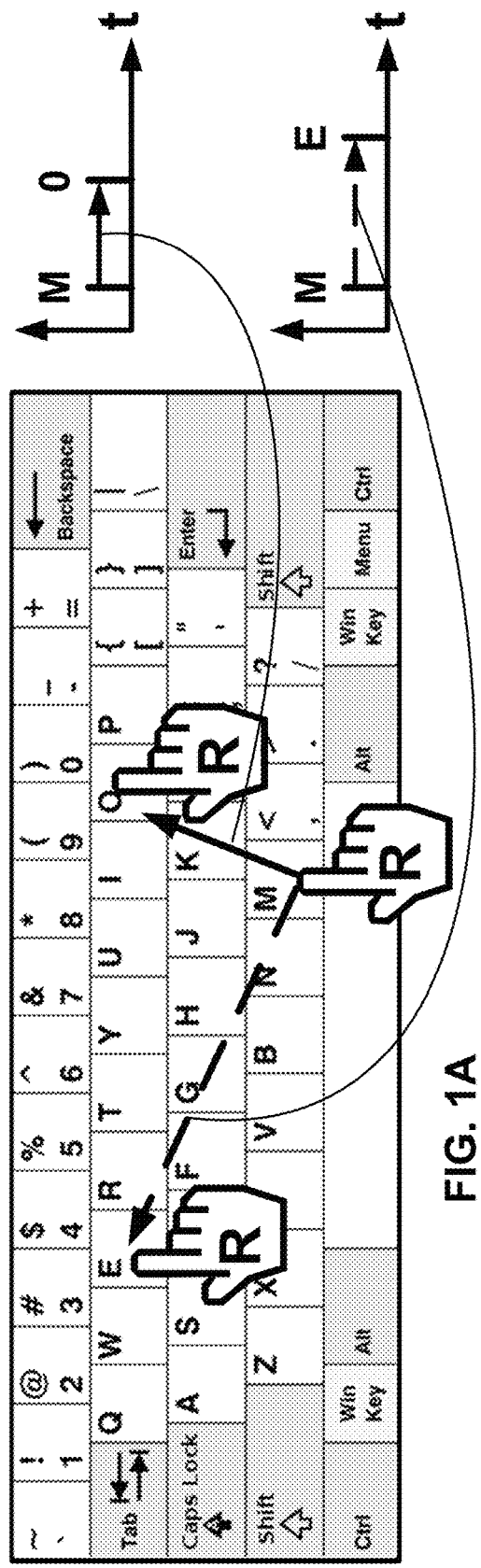
FIG. 1A depicts an example of one-handed typing and associated keyflight timings, in accordance with certain exemplary implementations of the disclosed technology.
Figure 1B:
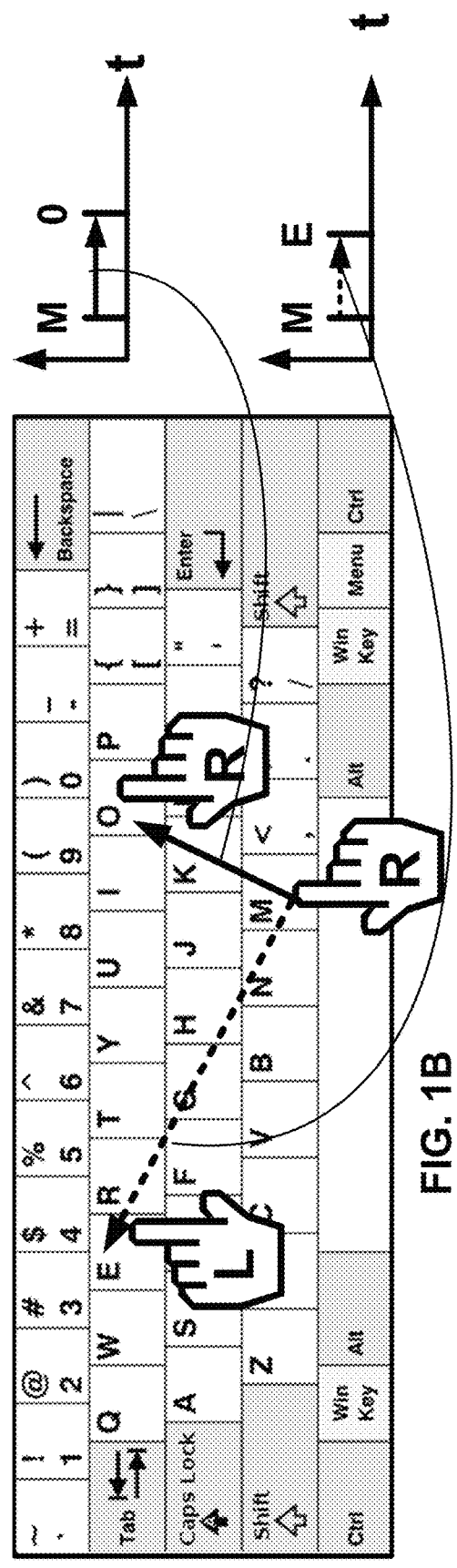
FIG. 1B depicts an example of two-handed intragroup typing and associated keyflight timings illustrating a substantially equal keyflight times for "M" to "O" keys, but reduced keyflight times for "M" to "E" keys compared to the one-handed typing example shown in FIG. 1A, in accordance with certain exemplary implementations of the disclosed technology.

FIG. 1A depicts a one-handed data entry example on the left side of the figure, and associated keyflight timings on the right side of the figure, in accordance with certain exemplary implementations of the disclosed technology. FIG. 1B depicts example two-handed data entry and associated keyflight timings, illustrating substantially equal keyflight times for the "M" and "O" key sequence entry compared to the one-handed typing example shown in FIG. 1A, but substantially reduced keyflight times for the "M" and "E" key sequence entry compared to the one-handed typing example shown in FIG. 1A. This is because a user's left hand may hover above "E" key and may press this key immediately after the user's right hand presses the "M" key, rather than taking time to traverse the distance between the "M"

and "E" keys with the right hand, as depicted in FIG. 1A. Certain implementations of the disclosed technology may utilize such keyflight times to distinguish between one- or two-handed typing.

The examples illustrated in FIG. 1A and FIG. 1B depict an implementation where the actual pressed keys and timing between key presses may be known, (for example, the keys "M," "E," and "O,") which may be a simple way to detect one- vs two-handed typing when the value of the key is known in addition to the keyflight timings. However as will be explained below, other implementations of the disclosed technology may be utilized to detect one- vs two-hand typing even when the actual key information is masked and/or not available.

Figure 2A:
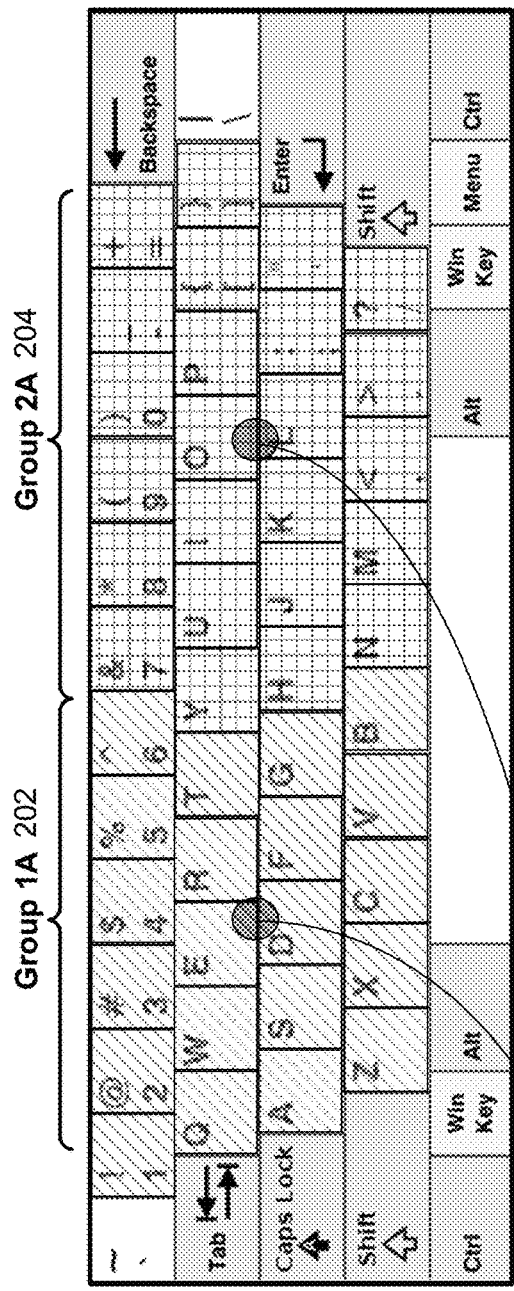
FIG. 2A illustrates an example of a keyboard layout divided into two groups of keys (Group 1A and Group 2A) with distinctly different proximal properties and associated cluster centroids, in accordance with certain exemplary implementations of the disclosed technology.
Figure 2B:
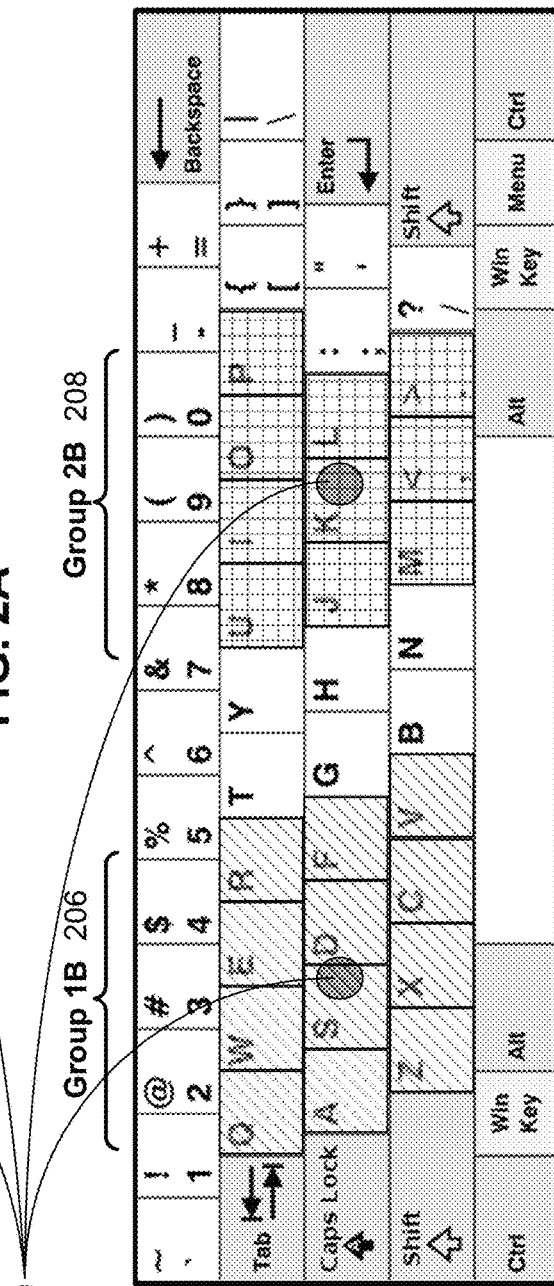
FIG. 2B illustrates another example of a keyboard layout divided into two smaller groups of keys (Group 1B and Group 2B) with distinctly different proximal properties and associated cluster centroids, in accordance with certain exemplary implementations of the disclosed technology.

FIG. 2A illustrates an example of a keyboard layout divided into two groups of keys: Group 1A 202 and Group 2A 204, with distinctly different proximal properties and respective associated cluster centroids 210. FIG. 2B illustrates another example of a keyboard layout divided into two smaller groups of keys: Group 1B 206 and Group 2B 208 with distinctly different proximal properties and associated respective cluster centroids 210. Accordingly, the timing distributions for intragroup keyflights and intergroup keyflights may be assessed. For example, when the number of samples in each distribution reaches a sufficient threshold, a statistical time differences d between the distributions may be computed using standard techniques, such as $$d = med(\text{intragroup keyflights}) - med(\text{intergroup keyflights}).$$

In other words, the median keyflight times (within and between divided groups of keys) may be used to distinguish between one hand and two hand typing. A normal two-handed typing behavior may be characterized by $d=0$, while a one-handed typing pattern may be characterized by $d<0$ due to the longer times required to type with keys that belong to different groups, and the associated keyflight time required to move a single hand from group to group.

In accordance with certain exemplary implementations of the disclosed technology, and as illustrated in FIGS. 2A and 2B, a keyboard layout may be divided into two or more groups in such a way that a distance between the centroids 210 of the physical coordinates of the keys in the groups is maximized using standard clustering approaches. In certain exemplary implementations, timing distributions may be assessed for at least the intergroup keyflights and the intragroup keyflights.

The groupings 202 204 shown in FIG. 2A and the groupings 206 208 shown in FIG. 2B are for illustration purposes only and are not intended to limit the choices for defining the different groups or the number of keys within each group. Furthermore, according to certain implementations, certain keys may be omitted from one or both groups. In certain implementations, the groups may overlap.

In one implementation, the detection of hand usage may be used to enhance the user experience when viewing a page by adapting a viewing or input element to an appropriate layout. In another implementation, the detection may be used as input to determine the likelihood of suspected coaching fraud, for example, during an online banking session, as discussed in U.S. Pat. No. 11,037,163 and incorporated herein by reference as if presented in full. In yet another implementation, the detection of one-handed typing may be used as an input to bot detection algorithms to reduce false positives from other modalities.

Figure 3:
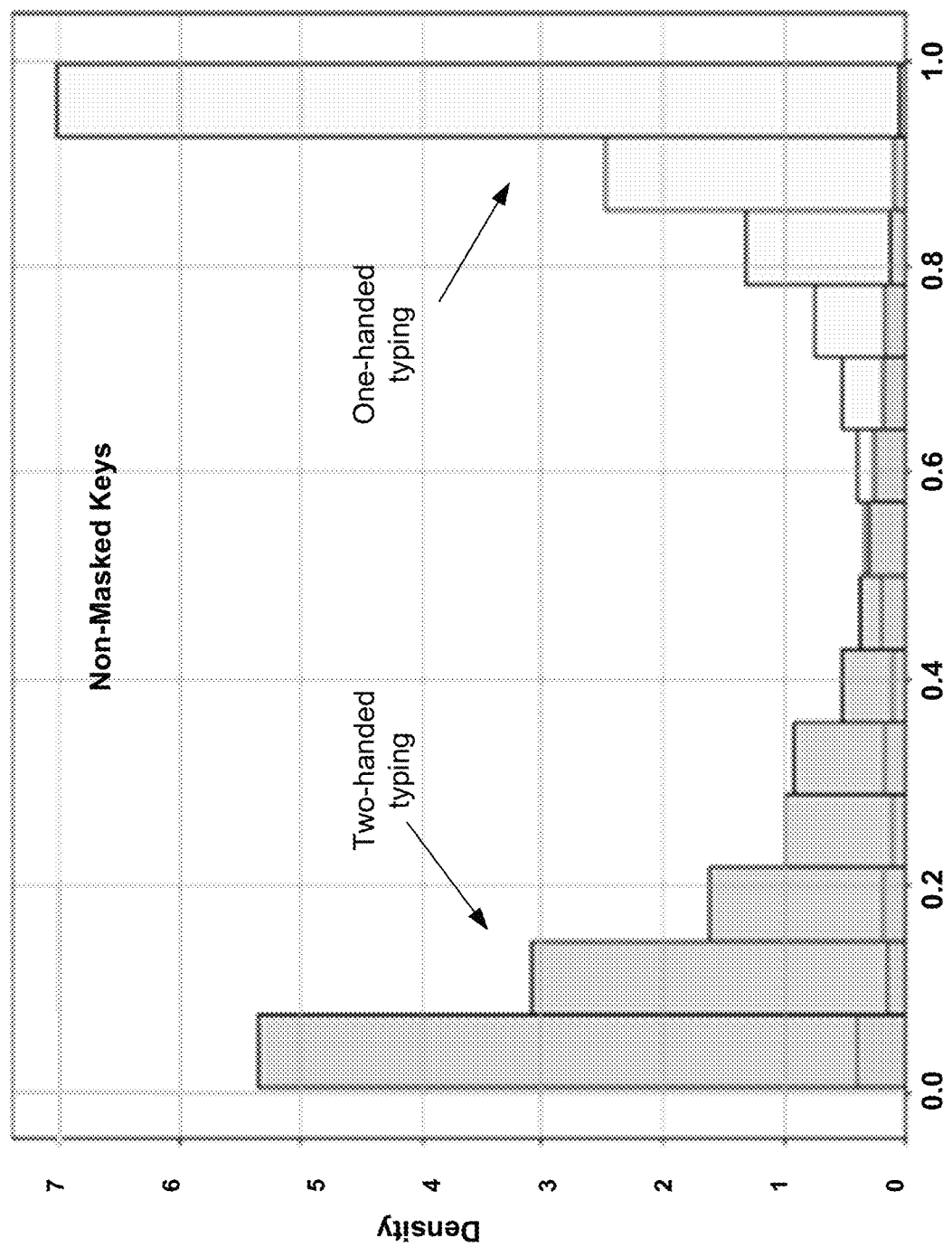
FIG. 3 shows an example of non-masked score distributions for two-handed typing (dark bars) vs. one-handed typing (light bars) for individual keys, in accordance with certain exemplary implementations of the disclosed technology. In this case the training features are keypress time values (the time between the down event and the up event of the key) and keyflight values (the time between a first key's down event and a second key's down event).

FIG. 3 shows an example of non-masked score distributions for two-handed typing (dark bars) vs. one-handed typing (light bars) for individual keys, in accordance with certain exemplary implementations of the disclosed technology. In this case the training features are keypress time values (the time between the down event and the up event of the key) and keyflight values (the time between a first key's down event and a second key's down event). The resulting scoring distributions shown in FIG. 3 may be achieved on a test set with free text typing, where key codes are not masked (i.e., we know which key is pressed) such that the algorithm trains on individual keys' features. The keyflight values in this case are specific for each combination (bigram) of keys such that the time it takes between pressing letter A to letter B is a separate feature from the time from pressing A to C, or B to A, etc. In certain implementations, an algorithm/model may be similar to one used in user-specific profiling for keystroke dynamics, but in this case, instead of training on user-specific dynamics, the model may be trained using keystroke dynamics from multiple users to classify handedness-specific typing rather than user-specific typing. In accordance with certain exemplary implementations of the disclosed technology, an algorithm may adapt a log-normal distribution to each feature, such that a mean and a variance of such a distribution are made to resemble the training data more and more with each successive training occasion. Thus, in certain implementations, the distribution may start from a default value and may be moved, contracted, or expanded according to the input data for each keypress and bigram.

Figure 4:
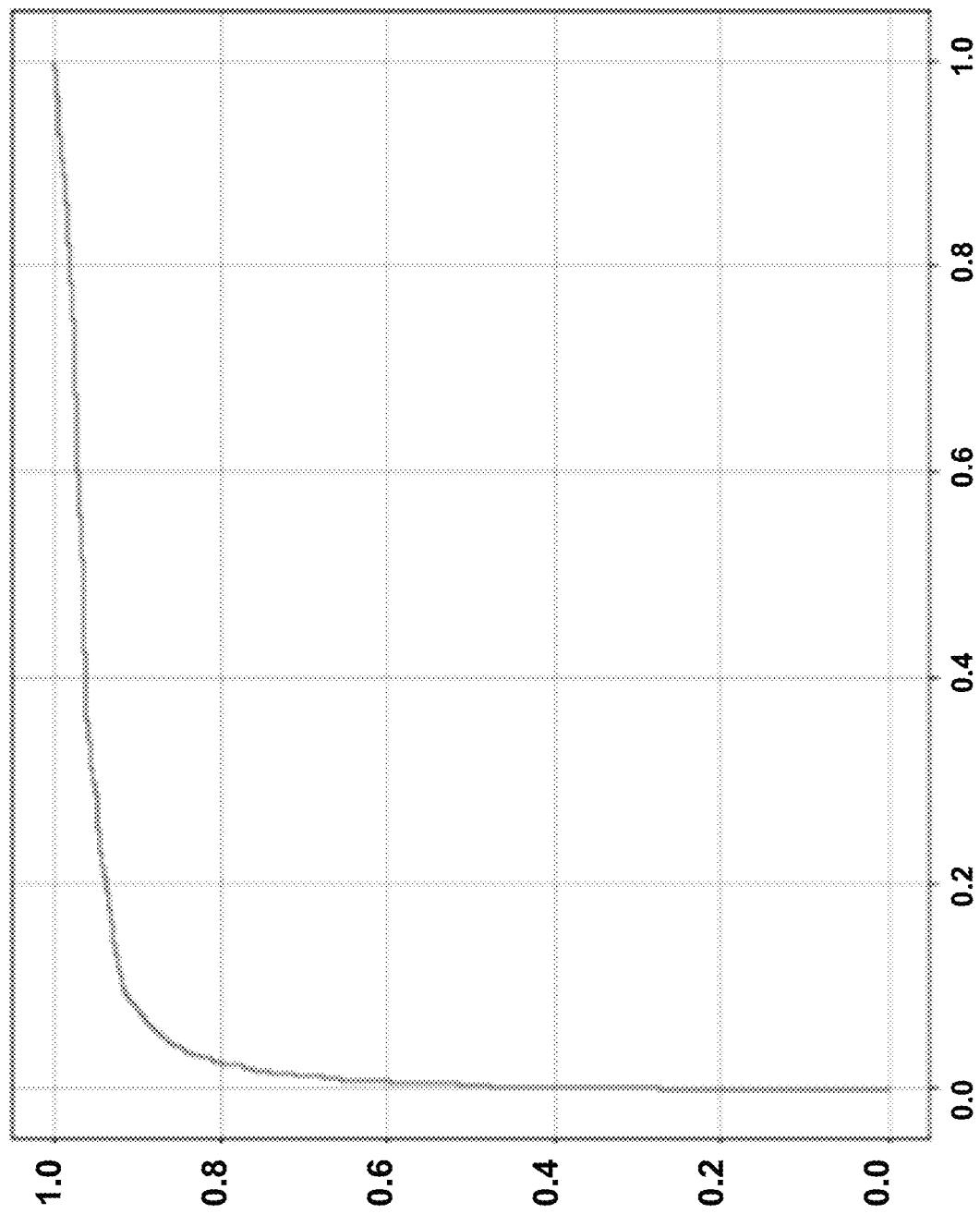
FIG. 4 shows classifier performance for predicting single-handed typing, which is above 0.95 area under the curve (AUC) and may be determined by plotting the False Positive Rate and the True Positive Rates that is produced on a labeled test set of data, in accordance with certain exemplary implementations of the disclosed technology.

FIG. 4 shows classifier performance for predicting single-handed typing, which is above 0.95 area under the curve (AUC) and may be determined by plotting the False Positive Rate and the True Positive Rates that are produced on a labeled test set of data, in accordance with certain exemplary implementations of the disclosed technology. FIG. 4 shows the resulting classifier performance stemming from scoring the one-handed, non-masked keypress and keyflight timing distributions as shown in FIG. 3. The curve shown in FIG. 4 is a standard receiver operating curve (ROC) and while not evident from the curve itself, the overall measure of the AUC of 0.95 ROC is given by plotting the False Positive Rate and the True Positive Rates that are produced on a labeled test set of data. AUC is computed as the area under this curve and may be used as a quick way to assess a classifier's performance. For example, an AUC—ROC curve is a performance measurement for the classification problems at various threshold settings. ROC is a probability curve and AUC represents the degree or measure of separability that tells how much the model is capable of distinguishing between classes. The higher the AUC, the better the model is at predicting 0 classes as 0 and 1 classes as 1. By analogy, the higher the AUC, the better the model is at distinguishing between one- and two-handed typing.

Figure 5:
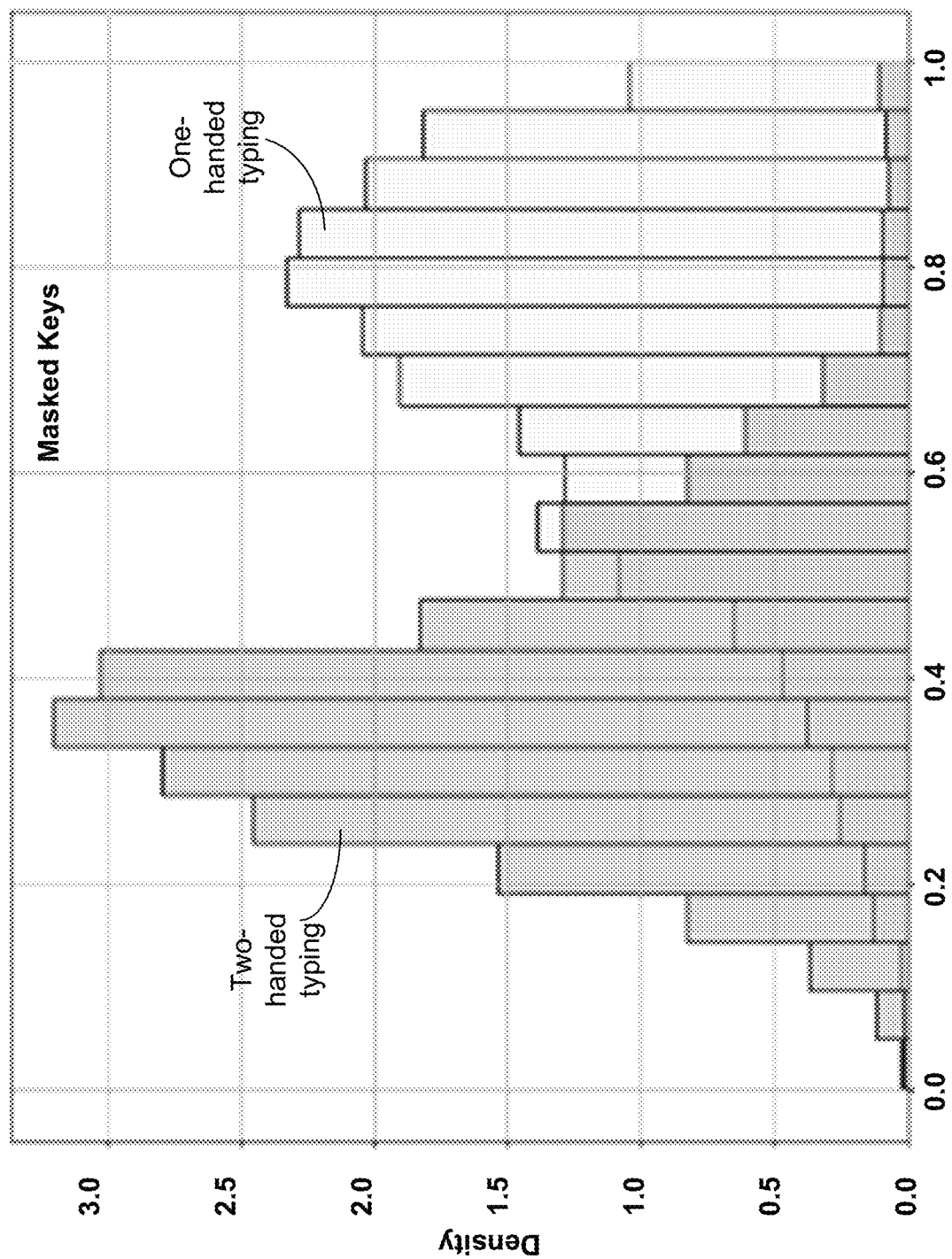
FIG. 5 shows an example of masked (i.e., unknown key codes) score distributions for two-handed typing (dark bars) vs. one-handed typing (light bars) for anonymized individual keys vs pair of keys key codes in which details of which keys and key pairs are used is unknown.

FIG. 5 shows an example of masked (i.e., unknown keys) score distributions for two-handed typing (dark bars) vs. one-handed typing (light bars) for anonymized individual keys vs pair of key codes in which details of which keys and key pairs are used is unknown. Practically speaking, such unknown keys may correspond to password field entry where the actual pressed key value is masked. In this case, the distributions may be plotted using a logistic regression classifier for the features median rollover, 90th percentile of the rollover, and median press times, where each keypress and keyflight are scored for each key. While the two distributions of one-handed vs. two-handed typing may not be as easily distinguishable as in the non-masked case shown in FIG. 3, this model still separates the data remarkably well, and may be utilized for distinguishing between one-handed and two-handed typing for masked keys.

Figure 6:
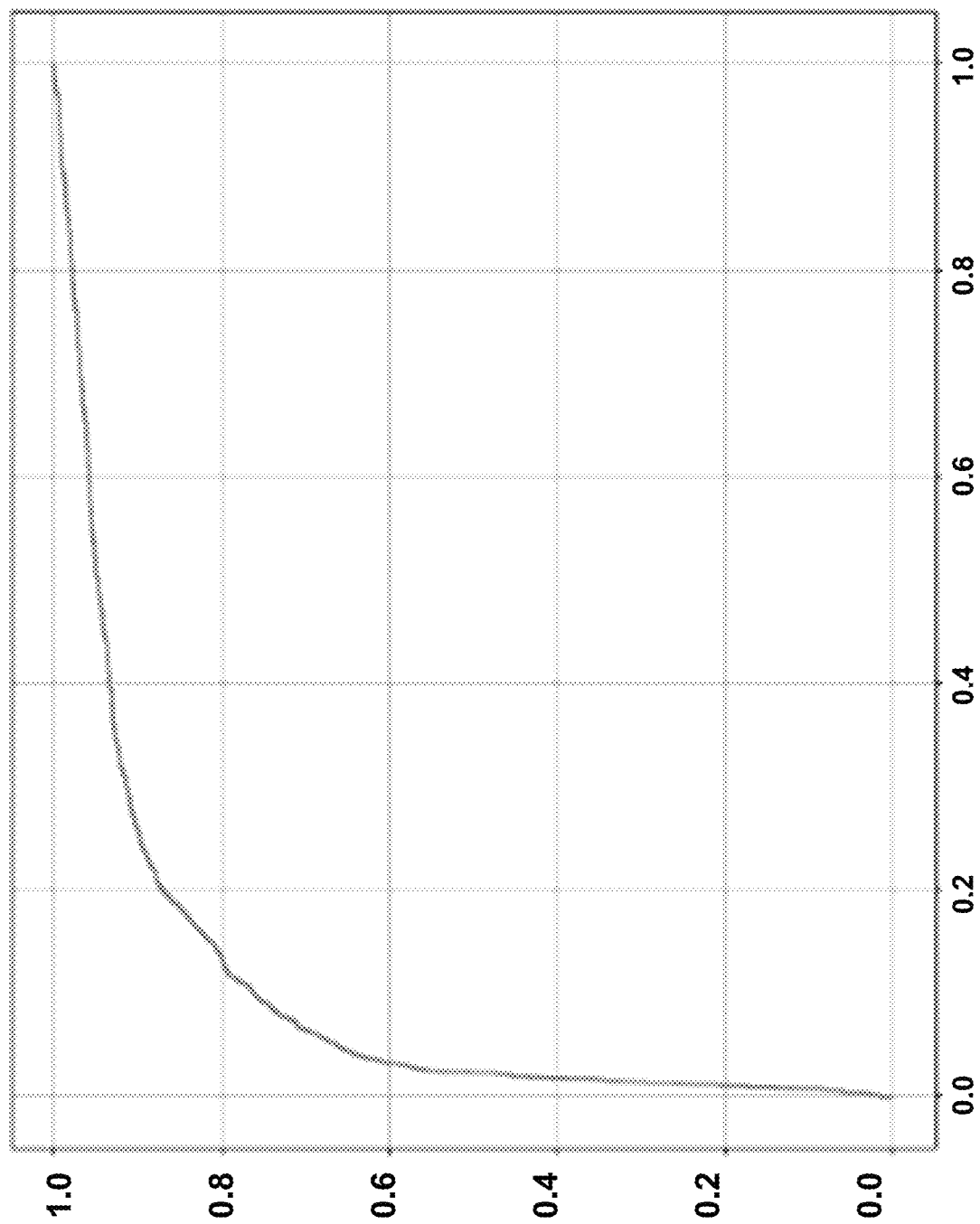
FIG. 6 shows resulting performance for anonymized key data (corresponding to FIG. 5) in which the AUC is 90%.

FIG. 6 shows resulting performance for anonymized key data (corresponding to FIG. 5) in which the AUC is 90%. As discussed above, the higher the AUC, the better the model is at distinguishing between one- and two-handed typing.

Figure 7:
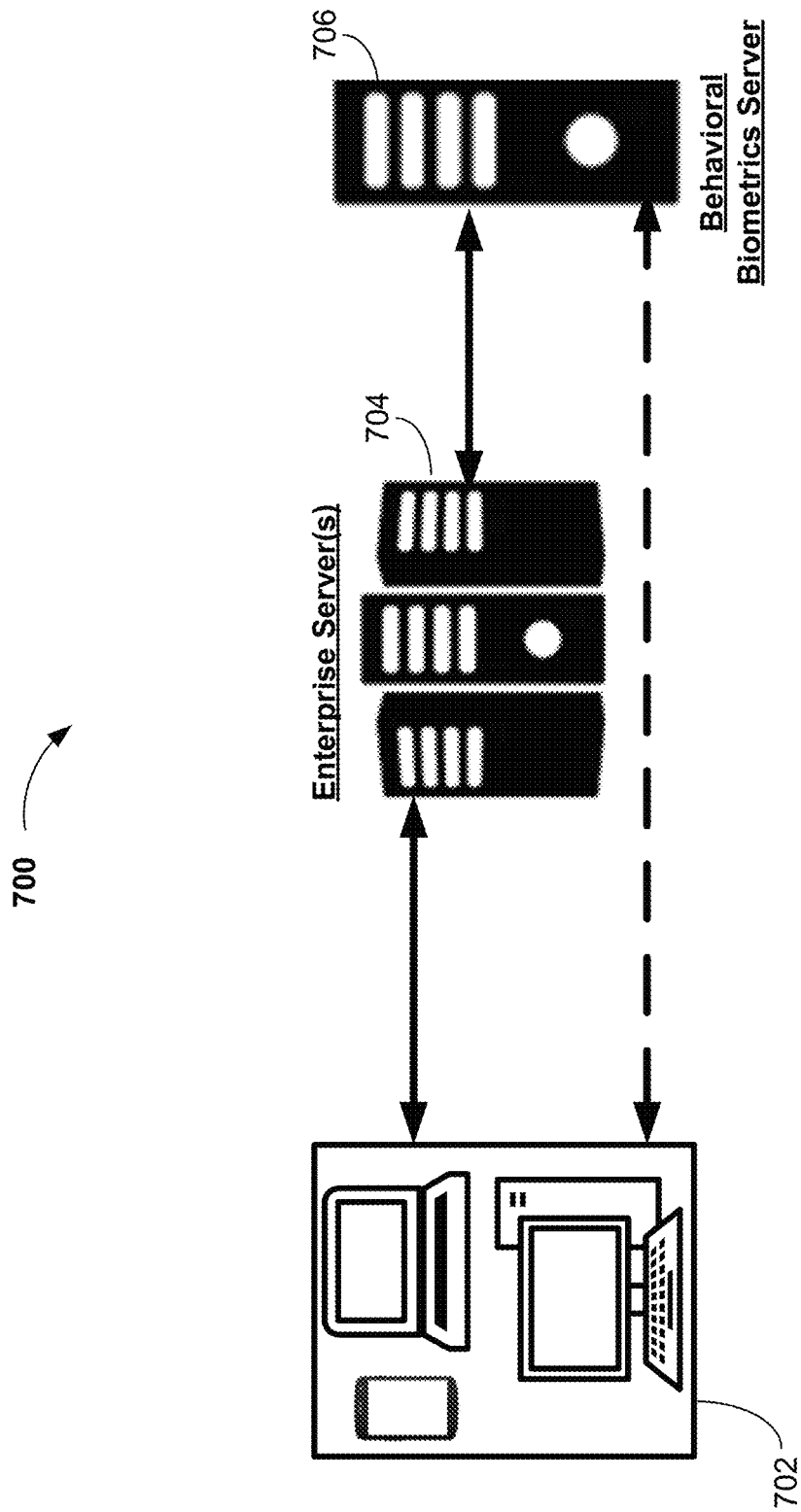
FIG. 7 depicts an example block diagram of a system, in accordance with certain implementations of the disclosed technology.

FIG. 7 depicts an example block diagram of a system 700, according to certain implementations of the disclosed technology, in which a user's computing device 702 may communicate with an Enterprise Server 704. In certain exemplary implementations, the Enterprise Server 704 and/or the user device 702 may be in communication with a Behavioral Biometrics Server 706.

In accordance with certain exemplary implementations of the disclosed technology, the arrangement depicted in FIG. 7 may illustrate a typical scenario where a user device 702 is utilized for online communication with a service provider (such as a bank) having an Enterprise Server 704 that provides digital services through the web or via its own apps, which may be downloaded to the user device 704 via the Google Play Store or Apple Store. To enable behavioral biometrics to monitor and evaluate user interactions performed by the user device 702, a web app including collector code may reside in the page or app opened by the user device 702 accessing the service provided by the Enterprise Server 704. In certain exemplary implementations, the collector code may collect and/or register data of user interactions. In certain exemplary implementations, the data collected by the collector code may be uploaded to the Behavioral Biometrics Server 708. In certain exemplary implementations, the collector code may register timing data from ups and downs of keystrokes, coordinate and timestamp data from mouse or touchscreens, and for mobile devices, the data may further comprise sensor readings from accelerometers, gyroscopes, light sensors, etc. In accordance with certain exemplary implementations of the disclosed technology, keystroke and/or keyflight timing gathered by the collector code may also be used to determine whether the use is typing with one hand or two hands, as discussed above.

Figure 8:
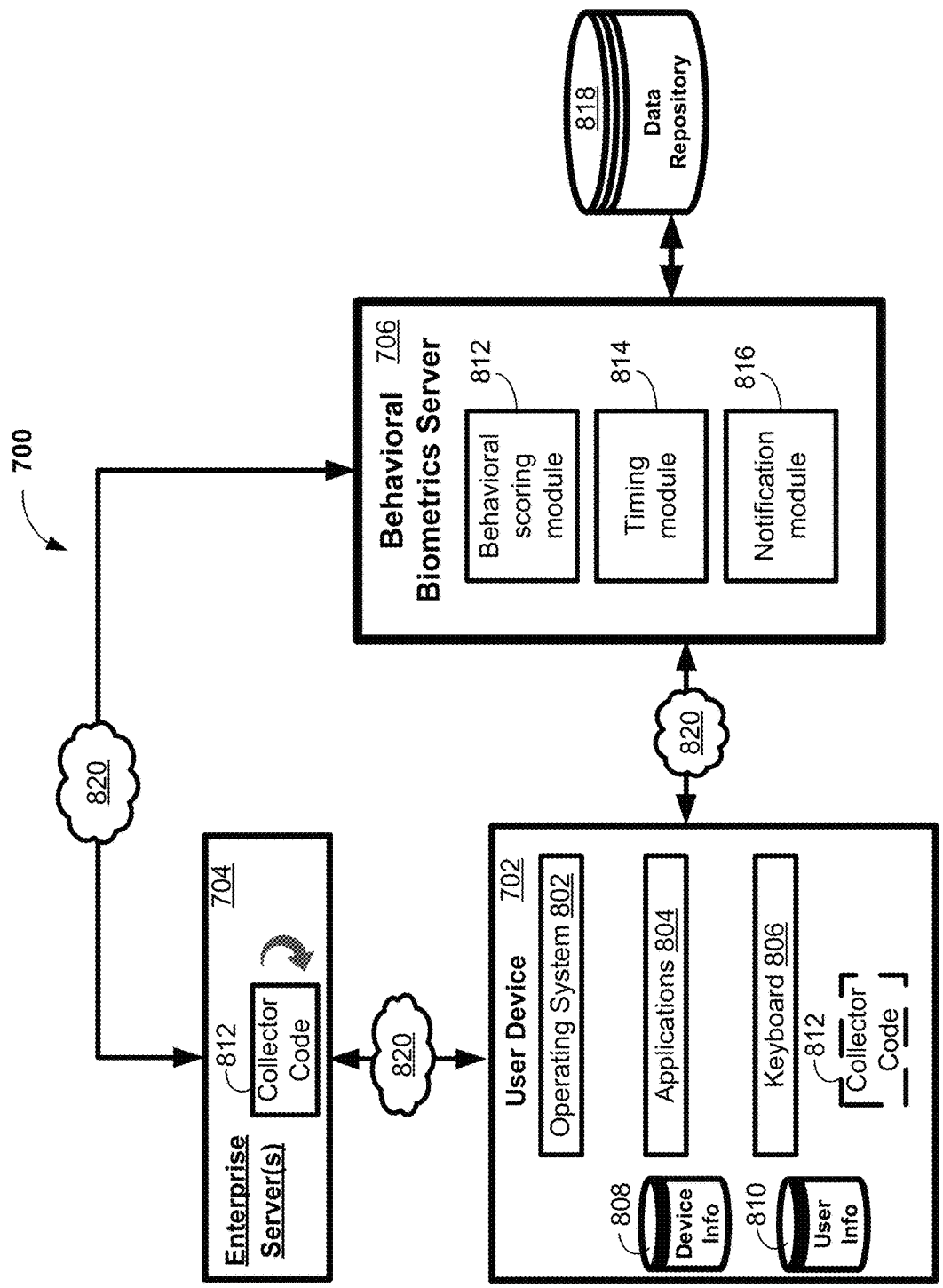
FIG. 8 depicts an example detailed block diagram of a system, in accordance with certain implementations of the disclosed technology.

FIG. 8 is a more detailed example block diagram of a system 700, (which may correspond to the system 700 shown in FIG. 7). In certain exemplary implementations, the user device 702 may include an operating system 802, applications 804, and one or more of a physical or virtual keyboard 806. Certain device information 808 may be stored in the memory of the user device 702. In certain exemplary implementations, user information 810 may be stored in the memory of the user device 702. In accordance with certain exemplary implementations of the disclosed technology, the collector code 812 may (optionally) reside on the user device 702, for example, via a downloaded app that allows the user device 702 to communicate with the Enterprise Server 704. In other exemplary implementations, the collector code 812 may reside with the Enterprise Server 704, for example, via JavaScript on a website of the Enterprise Server 704.

In certain exemplary implementations, the user device 702, the Enterprise Server 704, and/or the Behavioral Biometrics Server 706 may be in communication with one another via communications channels 820, which can include, but is not limited to a local area network, wide area network, cellular network, the Internet, etc.

The Behavioral Biometrics Server 706 may include various modules, such as a behavioral scoring module 812, a timing module 814, and/or a notification module 816, which may be used to enable the various functions of the Behavioral Biometrics Server 706. The behavioral scoring module 812, for example, may be utilized for distinguishing one-handed vs. two-handed modes of input used on the user device 702 based on behavioral data supplied by the collector code 812. In certain implementations, the behavioral scoring module 812 may select/use/update masked vs. unmasked models for determining keypress and/or keyflight statistics. In certain implementations, the timing module 814 may be utilized to handle some of the lower-level timing functions and/or data formatting for input to the Behavioral scoring module 812. In certain implementations, a notification module 816 may be utilized to communicate results of a one-handed vs. two-handed typing evaluation to one or both of the Enterprise Server 702 and/or the user device 702. Certain exemplary implementations of the Behavioral Biometrics Server 706 may be in communication with a data repository 818, for example, which may be used to store user, device, and/or previous behavioral data.

In accordance with certain exemplary implementations of the disclosed technology, the above-referenced collector code 812 may contain a function that recursively calls itself with a fixed interval (e.g., every 10 milliseconds) and may note and store the result of the call in a binned distribution, which may serve as a reference that enables the Behavioral Biometrics Server 706 to determine the level and/or characteristics of keypress and/or keyflight timing events that are produced during the online session, for example, by evaluating the resulting distribution of timing data.

In certain exemplary implementations, the collector code 812 may be implemented as a function called in response to a submit event from a web page, for example, hosted by the Enterprise server 704. In certain implementations, the collector code 812 may be implemented via a hook to the web page's JavaScript. Alternatively, the collector code 812 may be implemented as a continuous or periodically called function that performs streaming of the keyboard interaction data to the Behavioral Biometrics server 706.

Figure 9:
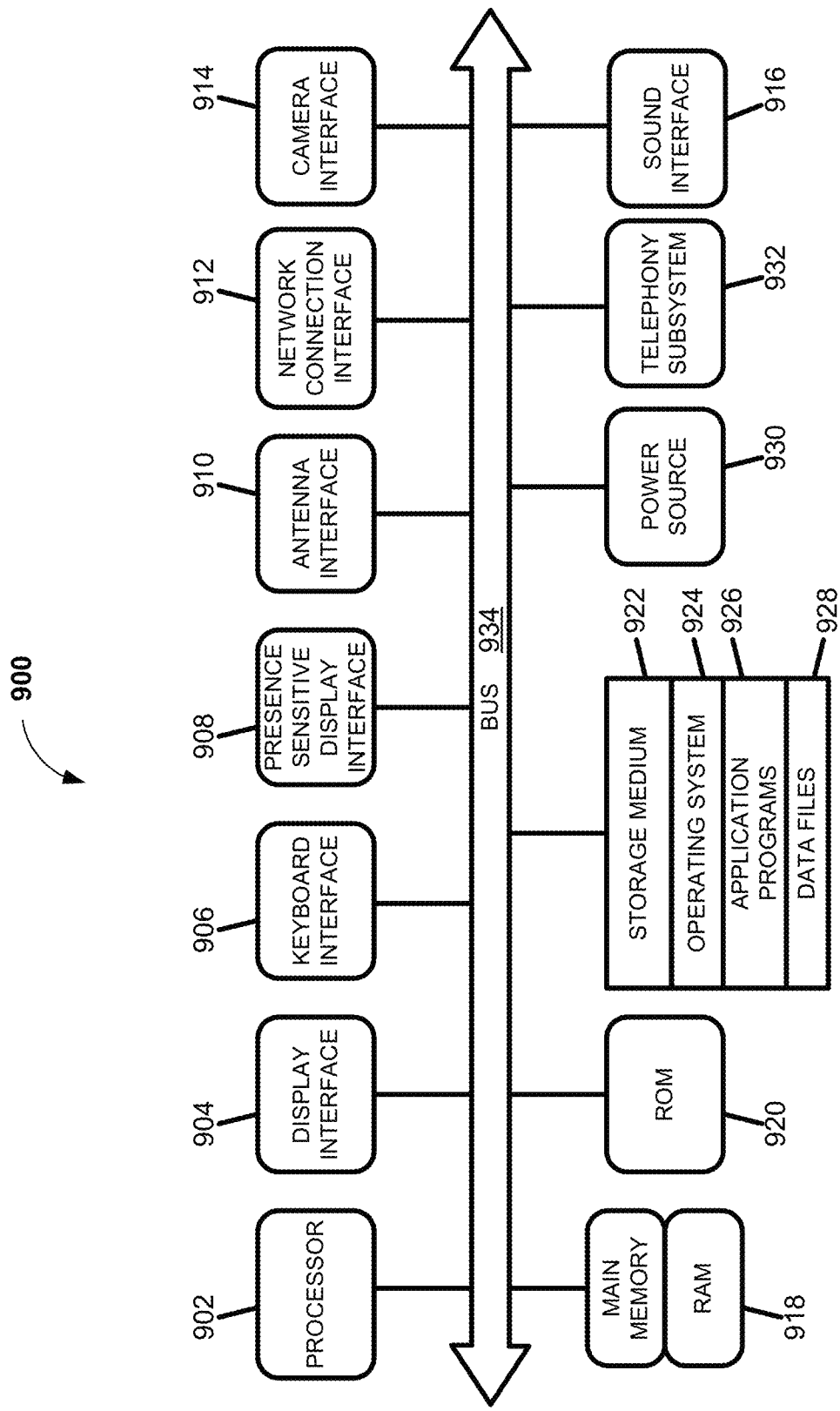
FIG. 9 illustrates an example computing device, in accordance with certain exemplary implementations of the disclosed technology.

FIG. 9 illustrates an example computing device 900, in accordance with certain exemplary implementations of the disclosed technology. Various implementations and methods herein may be embodied in non-transitory computer-readable media for execution by a processor. It will be understood that the computing device 900 is provided for example purposes only and does not limit the scope of the various implementations of the communication systems and methods.

The computing device 900 of FIG. 9 includes one or more processors where computer instructions are processed. The computing device 900 may comprise the processor 902, or it may be combined with one or more additional components shown in FIG. 9. In some instances, a computing device may be a processor, controller, or central processing unit (CPU). In yet other instances, a computing device may be a set of hardware components.

The computing device 900 may include a display interface 904 that acts as a communication interface and provides functions for rendering video, graphics, images, and texts on the display. In certain example implementations of the disclosed technology, the display interface 904 may be directly connected to a local display. In another example implementation, the display interface 904 may be configured for providing data, images, and other information for an external/remote display. In certain example implementations, the display interface 904 may wirelessly communicate, for example, via a Wi-Fi channel or other available network connection interface 912 to the external/remote display.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 904 may be operatively coupled to a local display. In another example, the display interface 904 may wirelessly communicate, for example, via the network connection interface 912 such as a Wi-Fi transceiver to the external/remote display.

The computing device 900 may include a keyboard interface 906 that provides a communication interface to a keyboard. According to certain example implementations of the disclosed technology, the presence-sensitive display interface 908 may provide a communication interface to various devices such as a pointing device, a touch screen, etc.

The computing device 900 may be configured to use an input device via one or more of the input/output interfaces (for example, the keyboard interface 906, the display interface 904, the presence-sensitive display interface 908, the network connection interface 912, camera interface 914, sound interface 916, etc.) to allow a user to capture information into the computing device 900. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 900 or may be a separate device. For example, the input device may be an accelerometer, a magnetometer, a digital camera, a microphone, and an optical sensor.

Example implementations of the computing device 900 may include an antenna interface 910 that provides a communication interface to an antenna; a network connection interface 912 that provides a communication interface to a network. According to certain example implementations, the antenna interface 910 may utilize to communicate with a Bluetooth transceiver.

In certain implementations, a camera interface 914 may be provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, random-access memory (RAM) 918 is provided, where computer instructions and data may be stored in a volatile memory device for processing by the CPU 902.

According to an example implementation, the computing device 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device 900 includes a storage medium 922 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device 900 includes a power source 930 that provides an appropriate alternating current (AC) or direct current (DC) to power components. According to an example implementation, the computing device 900 includes a telephony subsystem 932 that allows the device 900 to transmit and receive sound over a telephone network. The constituent devices and the CPU 902 communicate with each other over a bus 934.

In accordance with an example implementation, the CPU 902 has an appropriate structure to be a computer processor. In one arrangement, the computer CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution. In one example configuration, the device 900 includes at least 128 MB of RAM, and 256 MB of flash memory.

The storage medium 922 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 900 to access computer-executable process steps, application programs, and the like, stored on removable and non-removable memory media, to off-load data from the device 900 or to upload data onto the device 900. A computer program product, such as one utilizing a communication system may be tangibly embodied in storage medium 922, which may comprise a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices. It should also be understood by one skilled in the art that the devices depicted in FIG. 7 and/or FIG. 8 may be implemented on a computing device 900 such as is shown in FIG. 9.

Figure 10A:
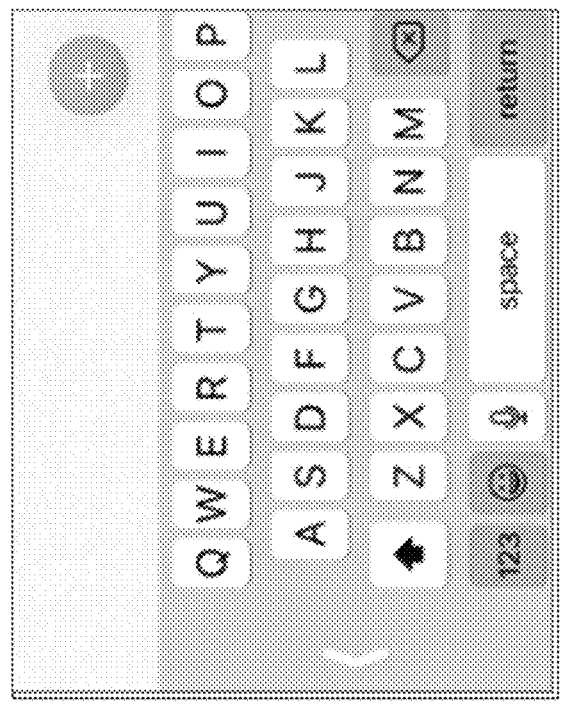
FIG. 10A illustrates a virtual keyboard having an initial layout prior to detection of one-handed or two-handed typing.
Figure 10B:
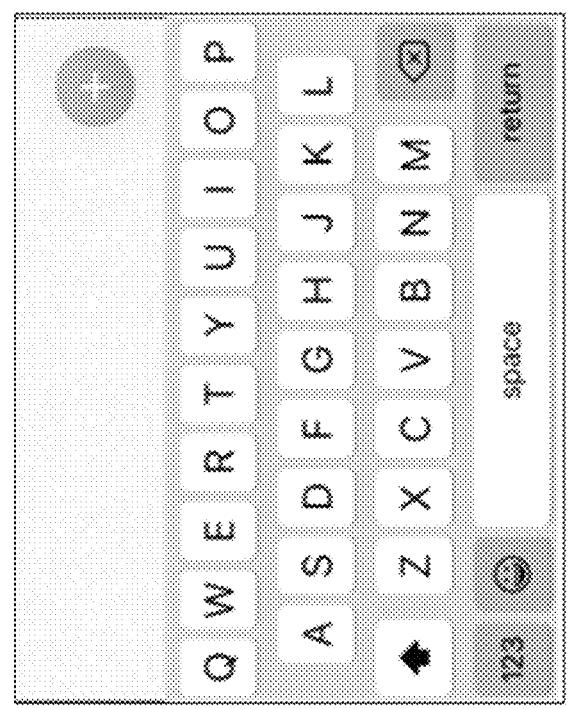
FIG. 10B illustrates an adaptation of the keyboard layout shown in FIG. 10A based on a determination of one-handed typing, in accordance with certain exemplary implementations of the disclosed technology.

FIG. 10A illustrates a virtual keyboard having an initial layout prior to detection of one-handed or two-handed typing. FIG. 10B illustrates an adaptation of the virtual keyboard layout shown in FIG. 10A based on a determination that the user is entering data into their device using one-handed typing, in accordance with certain exemplary implementations of the disclosed technology. In this illustration, the system (such as the system 700 shown in FIG. 7 and/or FIG. 8) may make a determination, based on keypress and/or keyflight timing data that the user is entering data into the virtual keyboard of their smartphone using the thumb of the right hand and the system may instruct the user device to adapt the virtual keyboard layout to an appropriate layout for such mode of entry. Many different types of keyboard layout adaptations may be utilized, and the adaptation shown in FIG. 10B is for illustrative purposes but should not be considered to limit the disclosed technology in any way.

Figure 11:
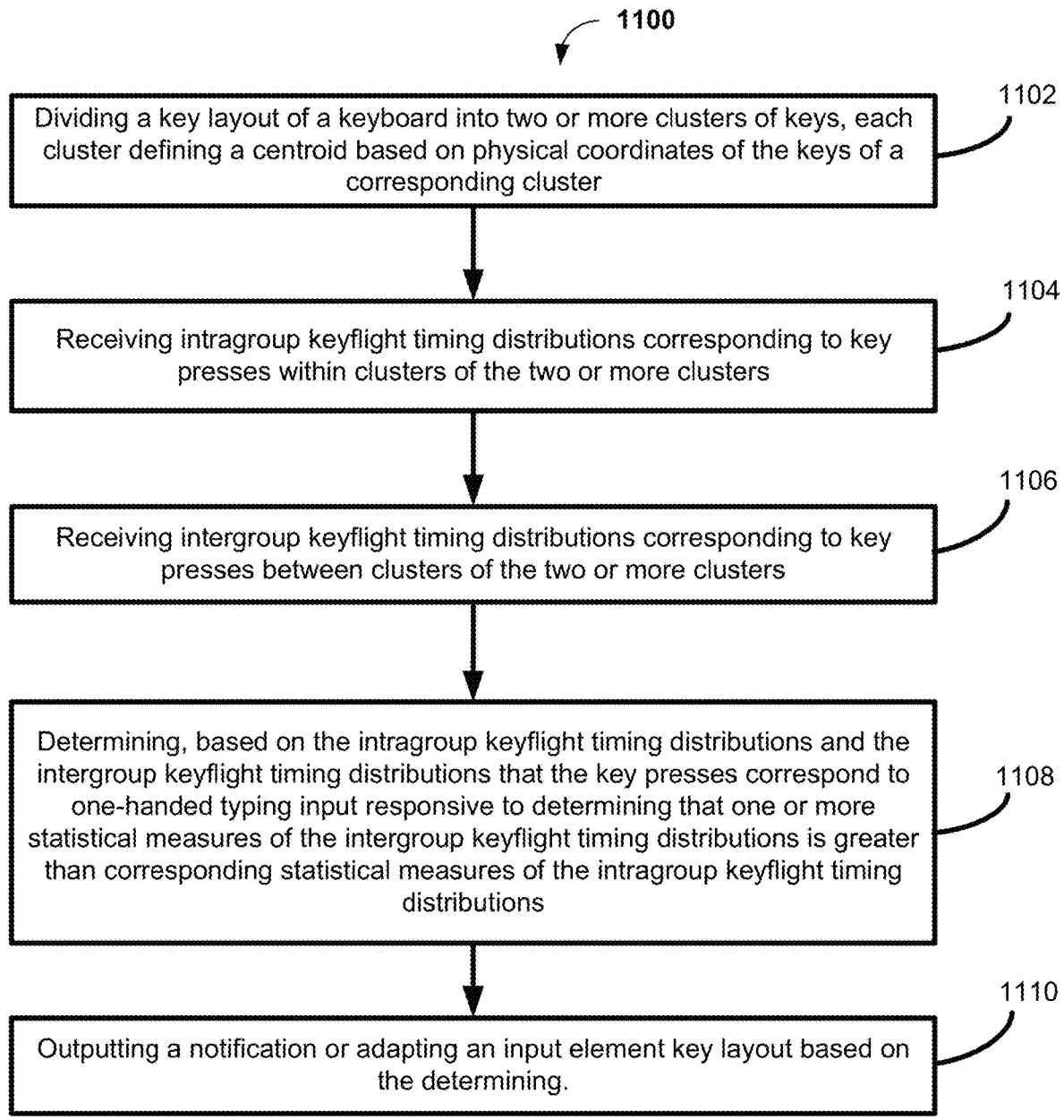
FIG. 11 is a flowchart of method, in accordance with certain exemplary implementations of the disclosed technology.

FIG. 11 is a flowchart of method 1100, in accordance with certain exemplary implementations of the disclosed technology. In block 1102, the method 1100 includes dividing a key layout of a keyboard into two or more clusters of keys, each cluster defining a centroid based on physical coordinates of the keys of a corresponding cluster. In block 1104, the method 1100 includes receiving intragroup keyflight timing distributions corresponding to key presses within clusters of the two or more clusters. In block 1106, the method 1100 includes receiving intergroup keyflight timing distributions corresponding to key presses between clusters of the two or more clusters. In block 1108, the method 1100 include determining, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions. In block 1110, the method 1100 includes outputting a notification or adapting an input element key layout based on the determining.

Certain implementations of the disclosed technology can include determining, based on the intragroup keyflight timing distributions and the intergroup keyflight timing distributions that the key presses correspond to two-handed typing input responsive to determining that one or more statistical measure of the intergroup keyflight timing distributions is less than corresponding statistical measures of the intragroup keyflight timing distributions.

In certain implementations, the one or more statistical measures comprises a statistical distance between the intragroup keyflight timing distributions A and intergroup keyflight timing distributions B. In certain implementations, the one or more statistical measures can include a statistical distance d, wherein median d=med(A)−med(B). In certain implementations, one-handed typing may be determined based on the statistical distance d being less than zero (d<0).

In accordance with certain exemplary implementations of the disclosed technology, dividing the key layout comprises maximizing a distance between the centroids of the two or more clusters.

Certain implementations of the disclosed technology include can further include determining a likelihood of suspected coaching based on determining the one-handed typing input.

Certain implementations of the disclosed technology include can include detecting bot-related input based on determining the one-handed typing input. In certain implementations, detecting the bot-related input may be utilized to reduce false positives from other determined input modalities.

In one implementation the determination may be used to enhance a user experience when viewing a page by adapting a viewing or input element to an appropriate hand setting.

In certain implementations, behavioral algorithms used for creating a profile of individual user typing behavior may be trained on a dataset labeled as one or two-handed typing but stemming from many users. The resulting trained model may then be used to classify session data of a single user as being from one- or two-handed typing, independently from the model(s) that handles possible user specific profiling and training. The results of such a handedness classification can thus be used without any attempt at user profiling being made.

In the case of non-masked data, such behavioral profiling algorithms may learn press and flight timing distributions for individual keys or key pairs. For the case of masked keys, such that individual keys have only an index when it was typed, another model may be used. For each press and flight of all keys, a Logistic Regression classifier may be used for the features median rollover, 90th percentile of the rollover, and median press times.

In some implementations, input from sensors such as an accelerometer, gyroscope, magnetometer, radar, etc., may be utilized to further corroborate the determination of one-handed vs. two-handed typing.

In one implementation, a classifier may output a probability of one-handedness typing, and this information is used to reduce false alarms that may result from the analysis of other modalities, such as a bot detection module, a remote access detection module, device detection or similar.

Certain exemplary implementations of the disclosed technology may analyze keyflight statistics between different groups of keys that have distinctly different proximal properties. For example, when a user types on a keyboard, the time between key depressions can vary depending on the location and arrangement of the keys being pressed. In some cases, it may be desirable to determine whether a user is typing with one or both hands, as this can provide insight into the user's typing behavior and potentially improve the user experience or prevent fraudulent activity.

Behavioral biometrics provides a way of identifying a user of a service by tying the user's behavior, as measured on its interactions with the device used to access the service, to previously learned behavior of that user. Such interactions (including keyboard interaction timing data) can be used to increase the confidence that a correct user is authenticated for accessing privileged content, for detecting anomalous aspects involved with the use of a service, etc. A behavioral biometrics service can provide an enhanced layer of security based on a user's typing, timing, keystroke dwell, etc., for example, when the user interacts with a webpage of an enterprise (such as a business, service provider, governmental agency, etc.). Thus, the analysis of keystroke and/or keyflight dynamics may be utilized for verifying certain modalities of interactions with a user device, and can improve the user experience when such methods are seamless and/or non-disruptive.

As used herein, the terms "data," "content," "information," and similar terms may be used interchangeably to refer to data capable of being transmitted, received, and/or stored in accordance with the disclosed technology. Thus, the use of any such terms should not be taken to limit the spirit and scope of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the terms "user" may be used to refer, without limitation, to a human, client, customer, purchaser, shopper, user, and the like who may be using any number of client devices and/or online identities to receive and interact with networked digital content.

Methods, apparatuses, and computer program products of the disclosed technology may be embodied by any of a variety of devices. For example, the method, apparatus, and computer program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still, further, example embodiments may be embodied by any of a variety of mobile devices, such as a portable digital assistant (PDA), mobile telephone, smartphone, laptop computer, tablet computer, wearable, or any combination of the aforementioned devices.

As will be appreciated, any such computer program instructions and/or another type of code may be loaded onto a computer, processor, or other programmable apparatus's circuitry to produce a machine, such that the computer, processor or other programmable circuitry that executes the code on the machine creates the means for implementing various functions, including those described herein.

It is also noted that all or some of the information presented by the example displays discussed herein can be based on data that is received, generated, and/or maintained by one or more components of apparatuses herein. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the subject matter and the operations described herein can be implemented in digital electronic circuitry, computer software, firmware, or hardware, including the structures, disclosed in this specification and their structural equivalents, or combinations of one or more of them. Embodiments of the subject matter described herein can be implemented as one or more computer programs, i.e., one or more modules of computer program instructions encoded on the computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "user device," "computing devices," and "mobile computing devices" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or another unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flow described herein can be performed by one or more programmable processors executing one or more computer programs to perform actions by operating on input information/data and generating output. Processors suitable for the execution of a computer program include, by way of example, both general and special purpose microprocessors, and one or more processors of any kind of digital computer. Generally, a processor will receive instructions and information/data from a read-only memory or a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard/touchscreen and/or a pointing device, e.g., a mouse or a trackball, by which the user can provide input to the computer. Other kinds of devices can be used to provide for interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

As utilized herein, the term "or" is used herein in both the alternative and conjunctive sense, unless otherwise indicated. The terms "illustrative" and "exemplary" are used to be examples with no indication of quality level. Like numbers refer to like elements throughout.

While this specification contains many specific implementation details, these should not be construed as limitations on the scope of any disclosures or of what may be claimed, but rather as descriptions of features specific to embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated with a single software product or packaged into multiple software products.

Thus, particular embodiments of the subject matter have been described. Other embodiments are within the scope of the following claims. In some cases, the actions recited in the claims can be performed in a different order and still achieve desirable results. Also, the processes depicted in the accompanying figures do not necessarily require the particular order shown, or sequential order, to achieve desirable results. In certain implementations, multitasking and parallel processing may be advantageous.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A method, comprising:

dividing a key layout of a keyboard into two or more clusters of keys, each cluster defining a centroid based on physical coordinates of the keys of a corresponding cluster;

receiving intragroup keyflight timing distributions corresponding to key presses within clusters of the two or more clusters;

receiving intergroup keyflight timing distributions corresponding to key presses between clusters of the two or more clusters;

determining, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions; and outputting a notification or adapting an input element key layout based on the determining.

2. The method of claim 1, further comprising determining, based on the intragroup keyflight timing distributions and the intergroup keyflight timing distributions that the key presses correspond to two-handed typing input responsive to determining that one or more statistical measure of the intergroup keyflight timing distributions is less than corresponding statistical measures of the intragroup keyflight timing distributions.

3. The method of claim 1, wherein the one or more statistical measures comprises a statistical distance between the intragroup keyflight timing distributions A and intergroup keyflight timing distributions B.

4. The method of claim 3, wherein the one or more statistical measures comprise a statistical distance d, wherein median d=med(A)−med(B).

5. The method of claim 3, wherein one-handed typing is determined based on med(B)−med(A) being greater than zero.

6. The method of claim 1, wherein dividing the key layout comprises maximizing a distance between the centroids of the two or more clusters.

7. The method of claim 1, further comprising determining a likelihood of suspected coaching based on determining the one-handed typing input.

8. The method of claim 1, further comprising detecting bot-related input based on determining the one-handed typing input.

9. The method of claim 8, wherein the detecting the bot-related input is utilized to reduce false positives from other determined input modalities.

10. A system, comprising:
a physical or virtual keyboard;
a processor; and
memory in communication with the processor, and storing instructions that, when executed by the processor, cause the processor to:
virtually divide a key layout of the keyboard into two or more clusters of keys, each cluster defining a centroid based on physical coordinates of the keys of a corresponding cluster;
receive intragroup keyflight timing distributions corresponding to key presses within clusters of the two or more clusters;
receive intergroup keyflight timing distributions corresponding to key presses between clusters of the two or more clusters;
determine, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions; and
output a notification or adapt an input element key layout based on determined one-handed or two-handed typing.

11. The system of claim 10, wherein the instructions that, when executed by the processor, further cause the processor to determine, based on the intragroup keyflight timing distributions and the intergroup keyflight timing distributions that the key presses correspond to two-handed typing input responsive to determining that one or more statistical measures of the intergroup keyflight timing distributions is less than corresponding statistical measures of the intragroup keyflight timing distributions.

12. The system of claim 10, wherein the one or more statistical measures comprises a statistical distance between the intragroup keyflight timing distributions A and intergroup keyflight timing distributions B.

13. The system of claim 12, wherein the one or more statistical measures comprise a statistical distance d, wherein median d=med(A)−med(B).

14. The system of claim 12, wherein one-handed typing is determined based on med(B)−med(A) the statistical distance d being less greater than zero.

15. The system of claim 10, wherein dividing the key layout comprises maximizing a distance between the centroids of the two or more clusters.

16. The system of claim 10, further comprising determining a likelihood of suspected coaching based on determining the one-handed typing input.

17. The system of claim 10, further comprising detecting bot-related input based on determining the one-handed typing input.

18. The system of claim 17, wherein the detecting the bot-related input is utilized to reduce false positives from other determined input modalities.

19. A non-transitory computer-readable storage medium storing instructions that are configured to cause one or more processors to perform a method of:
dividing a key layout of a keyboard into two or more clusters of keys, each cluster defining a centroid based on physical coordinates of the keys of a corresponding cluster;
receiving intragroup keyflight timing distributions corresponding to key presses within clusters of the two or more clusters;
receiving intergroup keyflight timing distributions corresponding to key presses between clusters of the two or more clusters;
determining, based on the intragroup keyflight timing distributions and the intergroup keyflight timing distributions that the key presses correspond to one-handed typing input responsive to determining that one or more statistical measures of the intergroup keyflight timing distributions is greater than corresponding statistical measures of the intragroup keyflight timing distributions; and
outputting a notification or adapting an input element key layout based on the determining.

20. The non-transitory computer-readable storage medium of claim 19,
wherein the one or more statistical measures comprises a statistical distance between the intragroup keyflight timing distributions A and intergroup keyflight timing distributions B, and wherein one-handed typing is determined based on med(B)−med(A) the statistical distance d being less greater than zero.

* * * * *